United States Patent Office

Re. 26,963
Reissued Oct. 13, 1970

26,963

INJECTABLE RECONSTITUTED COLLAGEN FLUID ADJUVANT FOR VACCINES AND OTHER DRUGS

Frank M. Hardy, Overland Park, Kans., by Haver-Lockhart Laboratories, Inc., assignee, Shawnee, Kans, a corporation of California No Drawing. Original No. 3,469,003, dated Sept. 23, 1969, Ser. No. 539,310, Apr. 1, 1966. Application for reissue Sept. 23, 1969, Ser. No. 871,991
Int. Cl. A61k *9/00, 27/00*
U.S. Cl. 424—89 8 Claims

Matter enclosed in heavy brackets [ ] appears in the original patent but forms no part of this reissue specification; matter printed in italics indicates the additions made by reissue.

ABSTRACT OF THE DISCLOSURE

An injectable medicinal composition and method of preparing the same comprising a fluid adjuvant characterized by the property of undergoing an in vivo increase in viscosity in the body of a host upon injection thereof and thereafter substantially complete dissociation and absorption in the host's body at a relatively slow rate, combined with a medicinal agent. The carrier comprises reconstituted collagen prepared by the mild acid extraction of precursor material obtained from the connective members of vertebrate animals, a partially repolymerized, reconstituted collagen as defined above, mixtures of these two types of reconstituted collagen, or mixtures of procollagen with either or both of the types of reconstituted collagen.

This invention relates to an injectable adjuvant, methods for preparing and utilizing the same, and to novel medicinal compositions including such adjuvant as a part thereof. More particularly, this invention relates to utilization of such adjuvant as a carrier to increase the effectiveness of an agent incorporated therewith.

It has been found that the effectiveness of some medicinal agents may be increased when the agent is incorporated into an injectable vehicle which includes an adjuvant to effect slow release of the medicinal material into the host. The term adjuvant, in this context, refers to the substance that operates as a binder, carrier, or suspending vehicle, for vaccines and medicinal agents alone or in combination, the function of which is to retard dispersion of such vaccines and medicinal agents, to allow for slow absorption thereof within the host's system and thus attain greater prophlactic or therapeutic activity. In the selection of such an adjuvant, many factors must be taken into consideration to insure a reduced rate of release of the medicinal agent with minimum toxic, allergenic, and antigenic effects imposed upon the host. Thus, the adjuvant carrier should not only be capable of slow dispersion in the host but also should be able to bind the vaccine or medicinal agent and release the active material to the host over a desired period as the carrier is itself dispersed within the host. The carrier may, thus, be used to introduce various types of medicament into the host's body. In this sense the terms medicament and medicinal agent are used as synonyms and are employed in their broad sense as defining an agent useful in the prevention, cure, or alleviation of disease or the prevention of some physiological condition or occurrence, such as pregnancy.

A number of carriers for the general purposes outlined have been proposed in the past, and have included, e.g., metallic oxides (i.e., aluminum hydroxide), inorganic chelates of salts, gelatins, various paraffin-type oils, synthesized resins, alginates, mucoid and polysacchoride compounds, caseinates, and blood-derived substances such as fibrin clots. None of these materials have been found entirely satisfactory primarily because of their adverse effects on the host.

The metallic oxides and chelates of salts have been associated with the production of sterile abcesses. In addition, these chemicals are rapidly dispersed within the body, thereby decreasing their effectiveness as an adjuvant. Other researchers have claimed that it is doubtful if such chemicals are ever completely removed from the body through the host's natural processes, thus leaving an inorganic debris as a residium. Moreover, while these salts and oxides appear to be low in toxicity, there exists the possibility that they may be phagocytized by the cells of the reticuloendothelial system (littoral cells and sinusoidal cells of the liver and spleen) as part of the insoluble debris residuum. There is evidence that such debris may be physically harmful to the various filter mechanisms of the body, e.g., the liver, spleen and kidneys.

The synthesized oils and petroleum derivatives may be particularly undesirable, in spite of relatively slow dispersion thereof in the body, inasmuch as they frequently are broken down into aromatic hydrocarbons, which may, in fact, be carcinogenic. Furthermore, these substances have been found to be capable of producing sterile abcesses and also may never be completely eliminated by the body.

With respect to fully denatured animal-derived substances, such as gelatin, the primary objection thereto is not the deleterious effect of the substance on its host, but rather that dispersion of the gelatin from the site of injection throughout the body of the host may be too rapid to qualify as an efficient absorption retarding vehicle; hence a poor adjuvant. Thus, whenever gelatin is used as a carrier, the gelatin is usually pre-treated with tanning agents or other inorganic compounds to retard rapid dispersion of the material throughout the body. These supplements may prove deleterious. The fate of such materials in the body of the host is not completely understood but the possibility exists that the formation of residual debris can result. Finally, with substances such as gelatin, which have a tendency to swell when introduced parenterally, under in vivo conditions, unpleasant mechanical side effects including discomfort and swelling may be produced.

Because blood derived fibrous substances have been found to elicit immune responses in the body of the host, use of such substances as adjuvants is undesirable because of immunogenic dangers. It is common knowledge that certain similarities exist in the fibrins, fibrinogens and thrombins derived from various species of animals thereby increasing the likelihood of immune or allergenic response when such materials are used. Although a few of the above described vehicles have been previously used or suggested as adjuvants, in part at least because of their attributes of relatively slow dispersion from the site of injection, they possess characteristics which make for poor control of their rate of intra-host dispersion.

It is, therefore, the primary objective of this invention to provide an injectable composition of the type described, wherein the adjuvant is operable to control the release of a vaccine or medicament to the host without the attendant detrimental effects associated with previously known adiuvants.

As a corollary to the foregoing object, it is a primary aim of this invention to provide as a part of an injectable composition an adjuvant of natural protein origin that has been derived by processing in a manner to extract and permit discarding of undesirable material to the end that a vehicle is produced which has attributes of unaltered collagen and thus may be used in combination with a medicinal agent, for slow release of the active material without attendant undesirable side effects.

A very important object of this invention is to provide an injectable composition of the type described, wherein the adjuvant is capable of slow dispersion in the body of the host so that the medicinal agent combined therewith is disseminated at a controlled rate over a predetermined period of time.

Another important object of this invention is to provide such an injectable composition wherein the agent is intimately incorporated with the adjuvant so that the rate of release of the agent to the host is associated with the concentration of the adjuvant introduced into the body.

A further important object of this invention is to provide an injectable composition as described wherein the adjuvants is capable of substantially maximum absorption within the body of the host so that the production of residual undispersed debris is minimized.

Yet another important object of this invention is to provide an injectable composition wherein the adjuvant for the medicament includes an aqueous solution closely regulated in terms of saline concentration and pH for the purpose of controlling the rate of dissociation and thereby elimination of the adjuvant.

Another aim of this invention is to provide such an injectable composition wherein the adjuvant for the medicament is substantially nontoxic and nonallergenic with respect to the host.

Yet another aim of this invention is to provide methods for producing such an injectable composition utilizing the novel adjuvant described so that the medicament can be intimately incorporated therewith and injected either in solid or liquid form.

A further aim of the instant invention is to provide a method for preparing an adjuvant for such an injectable composition wherein the adjuvant includes a collagen product and an aqueous solution to the end that the adjuvant is in a form for easy injection, but which, thereafter, forms a thicker gel within the host which disperses at a slow rate.

A still further aim of this invention is to provide a method for production of an adjuvant from a collagen product in a form including aqueous solution so that the saline concentration and pH of the carrier may be easily adjusted to vary the viscosity of the final product.

A still further important object of this invention is the provision of an injectable composition in the nature of an inoculant having an adjuvant therein of particularly valuable properties for use in conjunction with an immunogenic agent by virtue of the fact that said adjuvant is compatible with the medicament as well as the host so that substantially all of the medicament originally incorporated into the carrier is available after injection for inducing the production of antibodies, yet undesirable immune response reactions are minimized.

An important purpose of this invention is to provide a method for inoculating an animal wherein an immunological agent is combined with a slowly dispersing adjuvant to the end that the stimulation after inoculation by the agent for production of antibodies occurs over a relatively long period of time.

Another important object of this invention is to provide an injectable composition for administering medicinal agents such as vaccines and drugs wherein the active agent is combined with a slowly absorbable adjuvant therefor, and wherein the rate of release of the active material may be selectively varied as required for a particular material by the simple expedient of varying the saline concentration and pH level in the adjuvant preparation and thus permitting selective variation in the rate of dissociation and thereby the effective rate of dispersion of the adjuvant.

Other objects of the invention will be apparent from the following description thereof.

Collagen is the major constituent of white fibrous tissue which is found in the connective members (such as tendon, cartilage, and bone) of vertebrate animals. Collagen is also found in the yellow elastic tissues such as ligaments. Animal hide is a further source of collagen. The method of extraction and purification of collagen material from the tissue (or precursor) may vary somewhat, depending upon the nature of the precursor material selected. This variance is based upon consideration of the total composition of the precursor material.

The collagen substances usable in the preparation of an adjuvant of desired characteristics may be obtained from any of the sources above. In this respect, it is important to note that at least four general types of collagen have been identified, two of which are usable in the present invention as an adjuvant. The first type, which is referred to herein as tropocollagen or procollagen, comprises the soduim chloride extract from collagen sources such as cartilage and bone, or from tendon without salt extraction. This collagen material defined herein and in the claims as "Type 1 collagen" is not significantly usable alone as an adjuvant in accordance with this invention since it is of small molecular size, will rapidly disperse in the body after injection, and is extremely soluble with respect to the other types of collagen. The second type of collagen substance defined herein and in the claims as "Type 2 collagen" and which is usable in this invention may be defined as the mild acid extract from the precursors above. This type of collagen substance is obtained by extraction of the precursor with mild acetic acid after removal of the more soluble substances through a salt extraction as mentioned above. The third type of collagen defined herein and in the claims as "Type 3 collagen" and which is also usable for the present purposes is relatively insoluble in mild acid. This third type normally is derived by allowing the second type to age for a considerable period of time, which appears to be the result of repolymerization of at least a certain proportion of the collagen molecules causing the third type to disperse in vivo at a slower rate than that of the second type of collagen. The fourth type of collagen, and whcih has no application to the present invention, has been identified as that which is found as scar tissue in wounds, and thought to be the result of at least partial denaturization of the original collagen material by the process of alkalosis resulting from a subjection of the collagen containing body materials to alkalies in the host's system.

The preferred adjuvant material of the present invention is composed primarily of type 2 collagen referred to above, and in combination with a certain proportion of type 1. The type 1 collagen is useful primarily for incorporation with types 2 and 3 to modify the dispersion rate of the final adjuvant product. Thus, for purposes of this description, the procedure for preparation of type 1 and 2 collagen will initially be set forth in detail.

Fresh precursor material, preferably tendons, are stripped from the carcass of an animal such as a rat, a horse, or a cow, within approximately 15 to 30 minutes after the animal is killed. This short time is preferred to prevent the postmorten effect of enzyme cathepsins and the action of other degenerative chemicals which bring about the deterioration of collagen material. This precursor material is washed thoroughly several times in distilled water to remove traces of blood and other water soluble material. The precursor material is then washed briefly several times with a physiological saline solution containing approximately 0.9% sodium chloride by weight (isotonic solution) to further reduce extraneous substances. The washed precursor material is dried by blotting with a cloth or filter paper and weighed.

If it is not desirable to immediately start the extraction process after washing, the precursor material should be placed in an isotonic solution and subjected to sub-zero temperatures. Such frozen precursor material is thawed slowly, preferably in lukewarm water for approximately 15 to 20 minutes prior to extraction.

After washing, or after thawing if the material was frozen, the precursor material is steeped in petroleum ether for approximately three hours to extract free fats, fatty acids, and other ether soluble materials. Upon completion of the ether extraction step, the ether is decanted and the precursor material washed several times with deionized-distilled water at room temperature to remove residual ether.

The next procedure varies depending on whether it is desirable to extract for type 1 collagen or type 2. If type 2 collagen is to be obtained then the material extracted as follows. The precursor material is place in a bath of 0.9% NaCl solution and slowly agitated for approximately two hours at room temperature. This step is designed to effect removal of accessory proteins which are soluble in a saline solution. The amount of isotonic solution used should be at least 40 ml. for each gram of precursor material (based on the original weight of the precursor material before any of the extraction steps).

Because the extraction methods described above include a step for the removal of extraneous saline soluble substances, and, because type 1 collagen is saline soluble also, an alternative procedure must be followed to obtain a product rich in type 1 collagen, and, in view of the fact that the concentration of proteins other than collagen in tendon is relatively low, this precursor is the preferred source material for obtaining type 1 collagen. To produce type 1 collagen from tendon, the 0.9% saline extraction step is omitted. In order to obtain collagen fractions other than type 1, either tendon or skin, or a combination thereof, may be selected as the precursor substances. In these cases, the 0.9% saline extraction step is included to insure a final product of greater purity.

After extraction with saline solution, the precursor material is rinsed several times in deionized-distilled water to reduce the salt concentration in the material. The precursor material is then placed in a bath of an aqueous solution of trypsin containing 0.5% trypsin by weight and having a pH of approximately 8.0. This step should be continued for approximately two hours at room temperature to remove cellular material therein and reduce polysaccharides and mucopolysaccharides. Approximately 40 ml. of solution are required for each gram of precursor material (original weight).

After trypsinization, the precursor material is washed several times with deionized-distilled water to remove the trypsin and then steeped again in petroleum ether overnight at room temperature to further reduce the concentration of liquids, oils, and other ether-soluble materials. Next, the precursor collagen material is steeped in chloroform overnight at room temperature for removal of chloroform-soluble impurities and then washed several times with deionized-distilled water to remove the chloroform.

Substantially all of the noncollagen substances originally present in the precursor material are removed during the foregoing steps and the relatively pure collagen has a shiny white appearance. The relatively pure collagen is then placed in a bath of approximately 0.01 normal acetic acid solution preferably having a pH of about 4.0 and permitted to remain in such solution for a period of approximately five hours at room temperature. Sufficient 0.01 N acetic acid should be used to thoroughly disperse the collagen throughout the acid solution (approximately 200 ml. for each gram of original weight of the precursor material before extraction).

Following dispersion of the material in mild acetic acid, it is then passed through relatively fine mesh nylon filters of conventional design and the residue collected discarded. The filtrate obtained is viscous in character and varies in appearance from clear to cloudy white, depending on the amount of acetic acid used during the dispersion step.

The pH of the mild acid dispersion of collagen derivative is now increased by the addition of 4% sodium hydroxide solution to cause precipitation of the collagen material. The final pH of the solution is of extreme importance, as will be explained hereinafter and, therefore, a pH meter should be utilized. As the pH is increased, the coazervate colloidal suspension is further repolymerized and the collagen material precipitates. The product obtained may be referred to as reconstituted collagen and this nomenclature will be retained for the purposes of this specification. The final pH of the solution may vary from 6.0 to 9.0, depending on the nature of the original collagen precursor material and for an additional purpose as explained hereinafter.

After the pH of the dispersion has been adjusted as explained above, the reconstituted collagen-aqueous solution system is salted with sodium chloride. The amount of salt to be added at this step depends primarily upon considerations to be explained.

At this point, the reconstituted collagen commences to precipitate and agglomerate; however, the material is slow to settle and the system usually has a cloudy appearance. It is preferred that the system described be centrifuged at approximately 2000 r.p.m. for about 20 minutes followed by aspiration or decanting and discarding of the supernatant fluid. The sediment is then centrifuged again for approximately 30 minutes at about 3000 r.p.m. for additional removal of supernatant fluid. (When type 1 collagen is being prepared, it is not necessary to centrifuge to concentrate the colloid after neutralization and salt addition.)

At this point, the sediment at the bottom of the centrifuge tubes is white in color, highly viscous, and retains a quantity of solution in the order of 85 to 99 percent by weight (depending on source, and age of the precursor material). In this form, the adjuvant with adjusted pH and saline concentration is ready for use after sterilization thereof. The sterilization procedure will depend on the nature of the vaccine or medicinal agent selected. For example, if the agent consists primarily of killed virus, the carrier may be sterilized by the addition of small quantities of formalin in the usual manner. On the other hand, if the agent selected is live virus, then bacteriostatic agents such as antibiotics may be used. The vaccine or medicinal agent is added directly to the adjuvant thus forming an inoculant which will set up as a light gel after injection into the body of the host with the agent intimately incorporated with the carrier. A solid inoculant is prepared by drying the adjuvant and vaccine or medicinal agent before injection. In either form, the agent will be introduced and dispersed throughout the body of the host as regulated by the rate at which the adjuvant liberates agent and as both are absorbed by the host.

It has been found that the rate of dispersion of the carrier mass in the presence of an isotonic saline solution (as occurs in vitro) depends on the pH and saline concentration of the solution in the carrier system as well as the basic type collagen used, e.g., 1, 2, and 3 or combinations thereof. The chart below illustrates the relative dispersibility of the carrier in the presence of an isotonic saline solution at various pH levels and salt concentrations.

DISPERSIBILITY OF RECONSTITUTED COLLAGEN CARRIER IN THE PRESENCE OF ISOTONIC SOLUTION AT DIFFERENT pH LEVELS AND SALT CONCENTRATIONS IN THE CARRIER

| | 0 Tonicity | .50 Isotonic, .45 gm. NaCl/100 ml. | Isotonic, .9 gm. NaCl/100 ml. | 1.5 Isotonic, 1.35 gm. NaCl/100 ml. | 2.0 Isotonic, 1.8 gm. NaCl/100 ml. |
|---|---|---|---|---|---|
| pH 6.0 | C | D | E | E | F |
| pH 6.4 | C | D | D | E | E |
| pH 6.8 | B | C | D | D | E |
| pH 7.0 | B | C | C | D | E |
| pH 7.4 | B | B | C | D | E |
| pH 7.8 | A | B | C | D | E |
| pH 8.0 | A | B | C | D | E |
| pH 8.2 | A | B | B | C | D |
| pH 8.5 | A | A | B | C | D |

A = Relatively indispersible.
B = Very slowly dispersible (50% in 30 days).
C = Slowly dispersible (50% in 14 days).
D = Moderately dispersible (50% in 7 days).
E = Very dispersible (50% in 3 days).
F = Extremely dispersible (50% in 36 hours).

Thus, by carefully adjusting the pH and saline concentration in the adjuvant at the time the reconstituted collagen is precipitated, the life of the inoculant after it sets up as a light gel in vivo and its rate of dispersion may be regulated and predicted.

The adjuvant having a preselected pH and saline concentration is mixed directly with the immunological agent or medicinal in accordance with the desired actions of an adjuvant, i.e., to act as a vehicle for injection, as an agent suspending menstruum and to depress the rate of agent or medicinal absorption in the host and to insure by these attributes maximum immunogenic and medicinal activity.

EXAMPLE I

For immunizing a horse against Western Equine Encephalomyelitis virus, approximately 0.5 ml. of reconstituted fluid coolagen preparation containing approximately 0.001 gm. of reconstituted collagen per 0.5 ml. of fluid, having a pH of approximately 8.0 and a sodium chloride concentration of approximately 0.45 gm. NaCl/100 ml., is thoroughly mixed with about 0.5 ml. of killed Western Equine Encephalomyelitis virus obtained from a tissue culture harvest fluid having a titer of $10^{5.5}$ per 0.03 ml. of fluid or greater (as determined by I.C. inoculation in mice). The resultant formulation is administered intradermally as two doses of approximately 1 ml. each at seven to fourteen day intervals.

EXAMPLE II

For immunizing a horse against Eastern Equine Encephalomyelitis virus, approximately 0.5 ml. of reconstituted fluid collagen preparation containing approximately 0.001 gm. of reconstituted collagen per 0.5 ml. of fluid, having a pH of approximately 8.0 and a sodium chloride concentration of approximately 0.45 gm. NaCl/100 ml., is thoroughly mixed with about 0.5 ml. of killed Eastern Equine Encephalomyelitis virus obtained from a tissue culture harvest fluid having a titer of $10^{5.5}$ per 0.03 ml. of fluid or greater (as determined by I.C. inoculation in mice). The resultant formulation is administered intradermally as two doses of approximately 1 ml. each at seven to fourteen day intervals.

EXAMPLE III

For immunizing a horse againt Venezuelan Equine Encephalomyelitis virus, approximately 0.5 ml. of reconstituted fluid collagen preparation containing approximately 0.001 gm. of reconstituted collagen per 0.5 ml. of fluid, having a pH of approximately 8.0 and a sodium chloride concentration of approximately 0.45 gm. NaCl/100 ml., is thoroughly mixed with about 0.5 ml. of killed Venezuelan Equine Encephalomyelitis virus obtained from a tissue culture harvest fluid having a titer of $10^{5.5}$ per 0.03 ml. of fluid or greater (as determined by I.C. inoculation in mice). The resultant formulation is administered intradermally as two doses of approximately 1 ml. each at seven to fourteen day intervals.

EXAMPLE IV

For immunizing a dog against Canine Distemper virus, approximately 2.0 ml. of reconstituted fluid collagen preparation containing approximately 0.004 gm. of reconstituted collagen per 0.2 ml. of fluid, having a pH of approximately 7.2 and a sodium chloride concentration of approximately 0.45 gm. NaCl/100 ml., is thoroughly mixed with about 100 mg. of lyophylized virus preparation. The resultant formulation is administered intramuscularly.

EXAMPLE V

For administering vitamin A to swine or cattle, approximately 0.85 ml. of reconstituted fluid collagen preparation containing approximately 0.0017 gm. of reconstituted collagen per 0.85 ml. of fluid, having a pH of approximately 7.0 and a sodium chloride concentration of approximately 1.8 gm. NaCl/100 ml., is thoroughly mixed with 0.01 ml. of a Penicillin-Streptomycin preparation having 100,000 units of the antibiotic per ml. of Penicillin-Streptomycin preparation, 0.025 ml. of polysorbate-80, 0.015 ml. of ethanol, 0.05 ml. of cottonseed oil, 0.05 ml. of soybean oil and 100,000 units of vitamin A. The resultant formulation is administered either subcutaneously or intramuscularly in 1.0 ml. doses.

EXAMPLE VI

For administering vitamin A to swine or cattle, approximately 0.75 ml. of reconstituted fluid collagen preparation containing approximately 0.0015 gm. of reconstituted collagen per 0.75 ml. of fluid, having a pH of approximately 7.0 and a sodium chloride concentration of approximately 1.8 gm. NaCl/100 ml., is thoroughly mixed with 0.10 ml. of sodium chloride solution having a concentration of 1.8 gm. NaCl/100 ml. of 0.01 ml. of a penicillin-streptomycin preparation having 100,000 units of the antibiotic per ml. of penicillin-streptomycin preparation, 0.025 ml. of polysorbate-80, 0.015 ml. of ethanol, 0.05 ml. of cottonseed oil, 0.05 ml. of soybean oil and 100,000 units of vitamin A. The resultant formulation is administered either subcutaneously or intramuscularly in 1.0 ml. doses. This formulation will be more rapidly mobilized than the formulation illustrated in Example V above.

Although the above procedure and examples are specifically directed at the production of a composition in fluid form which will set up in the body of the host to form a light gel, all of the compositions embodying the principles of the instant invention may be desiccated to obtain a solidified material. Techniques such as air drying, freeze drying and ultra-centrifugation, which are familiar to those skilled in the art, may be utilized to obtain such a desiccated composition. It has been found that a solidified filament produced by extrusion, for example, is a highly useful form since the filament may be cut into short lengths and readily packaged in the bore of a disposable trochar-type needle. In the solidified form, the composition, after injection into the host, is very slowly dissociated by body fluids.

In every case, whether the inoculant is injected in the fluid or a solid form similar results are obtained in the body of the host. Reconstituted collagen possesses properties which are similar to the properties of collagen in its natural state. Natural collagen and reconstituted collagen are proteins, yet are characterized by the unusual property (at least for proteins) of being substantially nonantigenic in character. Additionally, reconstituted collagen is relatively nontoxic and nonallergenic with respect to mammals and is relatively inert with respect to immuologenic agents combined therewith. Further, an adjuvant comprising reconstituted collagen is capable of slow dissociation in the body fluids of the host; however, the reduction of residuum thereof in the host can be complete since the adjuvant carrier comprises only natural material and saline solution.

After gelation of the fluid adjuvant occurs in the body of the host, or after desiccation of the adjuvant to form a solid mass, the adjuvant forms a sturdy matrix which surrounds and holds the immunologenic agent in place. Titration of the antigen occurs either when the adjuvant itself is dissociated or they diffuse out into the surrounding body fluids. Thus, the agent can be dispersed into the body of the host at substantially the same rate that the adjuvant is dispersed. It has been found that the adjuavent comprised of reconstituted collagen, has not induced sterile abscesses after injection. The immunologenic inoculant and the methods for producing or utilizing the same embodying the principles of the instant invention, minimize, if not completely eliminate, all of the problems detracting from the desired resultant present when previously known inoculants were used. Further, none of the desirable characteristics of immunological inoculants have been lost.

Although the description and examples set forth above have been specifically related to preparation of injectable compositions including vitamins, embodying the preferred concepts of the invention, it is also to be understood that the collagen adjuvant defined herein also has utility in the administration of various types of medicinal agents such as hormones and antibiotics. The term medicinal agent is therefore, used herein in its broadest sense to include various types of vaccines and drugs. Since the carrier is in liquid form during at least certain of the stages of preparation thereof, both liquid and solid medicinal agents may be readily incorporated therein for homogenous admixture with and throughout the adjuvant product. Furthermore, in view of the fact that the adjuvant containing the medicinal agent may be processed to bring the same into final form without the necessity of employing elevated temperatures, various types of medicinal agents may be introduced into such carrier subject only to the limitations of pH and NaCl requirements of processing which could harm the active ingredient.

Having thus described the invention, what is claimed as new and desired to be secured by Letters Patent is:

1. An injectable medicinal composition comprising:

a fluid adjuvant carrier characterized by the property of undergoing an in vivo increase in viscosity in the body of a host upon injection thereof and thereafter substantially complete dissociation and absorption in the host's body at a relatively slow rate, said carrier consisting essentially of a proteinaceous composition gel and which has not been dessicated to obtain a solidified material or solidified to a filament produced by extrusion and selected from the group consisting of (a) Type 2 collagen produced by the mild acid extraction [of Type 1 tropocollagen or procollagen salt extracted] from a collagen source such as cartilage or bone [,] *after salt extraction thereof,* or from tendon without salt extraction, (b) Type 3 collagen obtained by aging (a) for a period of time sufficient to polymerize at least a certain proportion of the collagen molecules until there is obtained an in vivo dispersion rate which is slower than that of (a), (c) mixtures of (a) and (b), and (d) mixtures of (a), (b) or (c) with Type 1 tropocollagen or procollagen salt extracted from collagen source such as [catilage] *cartilage* or bone, or from tendon with salt extraction; and a medicinal agent admixed with said carrier.

2. An injectable medicinal composition as set forth in claim 1, wherein said medicinal agent is an immunological agent homogeneously incorporated with said carrier for slow release therefrom to the host substantially at the rate of dissociation and absorption of said carrier.

3. The composition of claim 1, wherein said carrier contains a quantity of sodium chloride having a total concentration of no greater than approximately 2 times the concentration of sodium chloride in an isotonic solution.

4. The composition of claim 1, wherein said carrier has a pH within a range of about 6 to approximately 9.

5. The composition of claim 1, wherein approximately 85 to 99 percent by weight of said carrier is water.

6. A process for producing antibodies in the body of a mammal at a controlled rate comprising injecting into the mammal a quantity of a composition including a fluid adjuvant carrier characterized by the property of undergoing an in vivo increase in viscosity in the body of a host upon injection thereof and thereafter substantially complete dissociation and absorption in the host's body at a relatively slow rate, said carrier consisting essentially of a proteinaceous composition which will set up in the body of the host to a light gel and which has not been dessicated to obtain a solidified material or solidified to a filament produced by extrusion and selected from the group consisting of (a) Type 2 collagen produced by the mild acid extraction [of Type 1 tropocollagen or procollagen salt extracted] from a collagen source such as cartilage or bone [,] *after salt extraction thereof,* or from tendon without salt extraction, (b) Type 3 collagen obtained by aging (a) for a period of time sufficient to polymerize at least a certain proportion of the collagen molecules until there is obtained an in vivo dispersion rate which is slower than that of (a), (c) mixtures of (a) and (b), and (d) mixtures of (a), (b) or (c) with Type 1 tropocollagen or procollagen salt extracted from a collagen source such as cartilage or bone, or from tendon without salt extraction, and an immunological agent intimately incorporated with said carrier for release therefrom to the host substantially at the rate of metabolism of said carrier.

7. The process of claim 6, wherein said carrier has a pH of between approximately 6 and 9.

8. The process of claim 6, wherein said carrier has a saline concentration no greater than about 2 times the saline concentration of an isotonic saline solution.

References Cited

The following references, cited by the Examiner, are of record in the patented file of this patent or the original patent.

UNITED STATES PATENTS

| | | | |
|---|---|---|---|
| 2,625,158 | 1/1953 | Lee et al. | 128—260 |
| 2,637,321 | 5/1953 | Cresswell | 128—335.5 |
| 3,156,620 | 11/1964 | Sharpless | 167—78 |
| 3,285,903 | 11/1966 | Taylor | 260—123.7 |
| 3,322,632 | 5/1967 | Schwick et al. | 167—78 |

SHEP K. ROSE, Primary Examiner

U.S. Cl. X.R.

128—335.5; 424—344, 359

PO-1050
(5/69)

UNITED STATES PATENT OFFICE
CERTIFICATE OF CORRECTION

Patent No. Re. 26,963 Dated October 13, 1970

Inventor(s) Frank M. Hardy

It is certified that error appears in the above-identified patent and that said Letters Patent are hereby corrected as shown below:

Claim 1, Column 10, line 2 "with" should read

-- without --.

Signed and sealed this 18th day of May 1971.

(SEAL)
Attest:

EDWARD M.FLETCHER,JR.
Attesting Officer

WILLIAM E. SCHUYLER, JR.
Commissioner of Patents